United States Patent
Park et al.

(10) Patent No.: US 8,788,694 B2
(45) Date of Patent: Jul. 22, 2014

(54) CONTENT UPDATE FROM A SERVER TO A CLIENT TERMINAL IN A DYNAMIC CONTENT DELIVERY (DCD) SYSTEM

(75) Inventors: Kyung Park, Yongin-si (KR); Jongkwan Park, Seongnam-si (KR); Sung Kim, Seongnam-si (KR); Kyoungchan Sohn, Seoul (KR)

(73) Assignee: SK Planet Co., Ltd. (KR)

( * ) Notice: Subject to any disclaimer, the term of this patent is extended or adjusted under 35 U.S.C. 154(b) by 112 days.

(21) Appl. No.: 12/529,251

(22) PCT Filed: Jun. 11, 2008

(86) PCT No.: PCT/KR2008/003243
§ 371 (c)(1),
(2), (4) Date: Aug. 31, 2009

(87) PCT Pub. No.: WO2008/153306
PCT Pub. Date: Dec. 18, 2008

(65) Prior Publication Data
US 2010/0070595 A1     Mar. 18, 2010

(30) Foreign Application Priority Data
Jun. 11, 2007   (KR) .................. 10-2007-0056889

(51) Int. Cl.
*G06F 15/16*     (2006.01)
*G06F 15/173*    (2006.01)
*H04N 7/173*     (2011.01)
*H04L 29/08*     (2006.01)

(52) U.S. Cl.
CPC .................. *H04L 29/08954* (2013.01); *H04N 7/173* (2013.01)
USPC ........................... 709/231; 709/226; 725/105

(58) Field of Classification Search
USPC .............. 709/201–206, 219, 223–229, 231; 725/86–134
See application file for complete search history.

(56) References Cited

U.S. PATENT DOCUMENTS

| | | | |
|---|---|---|---|
| 6,138,158 A * | 10/2000 | Boyle et al. .................... | 709/225 |
| 6,944,662 B2 * | 9/2005 | Devine et al. ................. | 709/225 |
| 6,965,770 B2 | 11/2005 | Walsh et al. | |
| 7,496,637 B2 * | 2/2009 | Han et al. ...................... | 709/217 |
| 7,640,322 B2 * | 12/2009 | Wendkos et al. ............. | 709/219 |
| 2003/0050058 A1 | 3/2003 | Walsh et al. | |
| 2005/0022237 A1 * | 1/2005 | Nomura .......................... | 725/39 |
| 2005/0119913 A1 | 6/2005 | Hornreich et al. | |
| 2006/0253567 A1 * | 11/2006 | Selin et al. .................... | 709/224 |
| 2007/0100960 A1 * | 5/2007 | Eichstaedt et al. ............ | 709/217 |

(Continued)

FOREIGN PATENT DOCUMENTS

| | | |
|---|---|---|
| CN | 1633817 A | 6/2005 |
| JP | 2002-152319 | 5/2002 |

(Continued)

*Primary Examiner* — Shirley Zhang
(74) *Attorney, Agent, or Firm* — Baker Hostetler LLP

(57) ABSTRACT

A method and dynamic content delivery (DCD) system for content update from a server to a client terminal comprising receiving a first message containing an identification information of one or more contents available for update from the server by a client terminal, sending a second message containing the identification information of a specific content to be updated among the one or more contents to request content update to the server; and receiving a third message containing the content or the address thereof corresponding to the identification information contained in the second message to respond to the second message.

10 Claims, 5 Drawing Sheets

(56) References Cited

U.S. PATENT DOCUMENTS

| | | | |
|---|---|---|---|
| 2007/0118619 A1* | 5/2007 | Schwesig et al. | 709/219 |
| 2007/0156807 A1* | 7/2007 | Ma et al. | 709/203 |
| 2007/0282959 A1* | 12/2007 | Stern | 709/206 |
| 2008/0134043 A1* | 6/2008 | Georgis et al. | 715/733 |
| 2008/0155112 A1* | 6/2008 | Ma et al. | 709/231 |
| 2009/0100348 A1* | 4/2009 | Castaignet et al. | 715/751 |
| 2009/0125773 A1* | 5/2009 | Lee et al. | 714/748 |
| 2010/0115091 A1* | 5/2010 | Park et al. | 709/224 |
| 2011/0238660 A1* | 9/2011 | Riggs | 707/726 |

FOREIGN PATENT DOCUMENTS

| | | |
|---|---|---|
| JP | 2002-334033 | 11/2002 |
| WO | 01/98904 | 12/2001 |
| WO | 2007032549 | 3/2007 |

\* cited by examiner

FIG. 4

| Contents List | | | |
|---|---|---|---|
| Content ID | Content Size (310) | Application ID (320) | Channel ID (330) |
| ■ C01 (311) | 100KB | A01 | CH01 |
| ■ C02 (312) | 120KB | A01 | CH01 |
| □ C03 (313) | 90KB | A02 | CH01 |
| □ C04 (314) | 210KB | A03 | CH02 |
| Total Size of Content (350) | 520KB | | |

\* Spared memory for Terminal : 400KB (300, 340)

CONTENT UPDATE FROM A SERVER TO A CLIENT TERMINAL IN A DYNAMIC CONTENT DELIVERY (DCD) SYSTEM

TECHNICAL FIELD

The present invention relates to a content delivery from a server to a client in a dynamic content delivery (DCD) system.

BACKGROUND ART

Network infrastructures have recently been expanded, and an increasing number of content providers are producing and storing contents desired by users. Users can visit sites run by such content providers and receive desired contents.

Efficient delivery of contents requires web syndication as a scheme for delivering information produced and modified in real time on the Internet. The web syndication includes, for example, RSS (Really Simple Syndication) and ATOM (Atom is an XML-based file format intended to allow lists of information, known as "feeds", to be synchronized between publishers and consumers. Feeds are composed of a number of items, known as "entries", each with an extensible set of attached metadata.), which have been proposed and adopted as standards. The RSS and ATOM have made it possible to distribute contents, and contents can be collected more efficiently by a program such as RSS Reader.

However, in mobile environments with comparatively limited resources, access to contents distributed by RSS/ATOM cannot be made in the same manner as in PC environments. In order to solve this problem, a scheme for delivering contents collected for mobile terminals in an optimized manner has been requested, and one of typical examples is DCD (Dynamic Content Delivery), the standardization of which is being conducted by OMA (Open Mobile Alliance). The DCD seeks to provide mobile terminal users with desired contents in the most efficient manner reflecting the users' preferences. Content delivery schemes for this purpose include a pull scheme employing DCD-1 Interface and a push scheme employing DCD-2 Interface. According to existing mobile services, mobile terminals of users must access sites on the wireless Internet and search a number of depths for desired contents. In contrast, the DCD aims to deliver contents to mobile terminals of users without having to visit and search sites for contents so that users are provided with desired contents that reflect the users' preferences to the greatest extent.

Referring to FIG. 1, the push scheme employing DCD-2 Interface is explained below.

FIG. 1 shows the push scheme employing DCD-2 Interface.

Subscription personalization request is sent from the DCD enabled client application 100 to the DCD content provider 130 so that the DCD enabled client application 100 receives and displays the content stored in the DCD content provider 130 at S 101, S102 and S103. The subscription personalization is optional according to the type of content. Because the specific content is not requested for the subscription.

The DCD content provider 130 publishes new content at the DCD server 120 at S104. This could be either the content matching subscription preferences or some general content of interest to multiple DCD enabled client application 100.

The DCD Server 120 acquires personalization information required to perform content adaptation to personalization sources 140 at S 105. Such information may include location, presence, terminal profile, etc.

The DCD Server 120 performs content adaptation based on the acquired personalization information and the application profile preferences obtained at registration at S 106.

Content is pushed to the DCD Client terminal 110 at S 107. Then, The Content is delivered to the DCD Enabled Client Application at S 108 and displayed on the DCD client terminal 110.

DISCLOSURE

Technical Solution

The present invention may provide the DCD system for enabling the DCD server to transmit only the content which the user wants.

In one aspect, there is provided a method for content update from a server to a client terminal in a dynamic content delivery (DCD) system, the method comprising: sending a first message from the server to the client terminal, wherein the first message contains an identification information of one or more contents available for update; receiving the first message by the client terminal and sending a second message to request content update to the server, wherein the second message contains the identification information of an specific content to be updated among the one or more contents; receiving the second message by the server and sending a third message to respond to the second message, wherein the third message contains the content or the address thereof corresponding to the identification information contained in the second message; and receiving the third message by the client terminal.

The first message may contain session-ID to identify a session between the server and the client terminal.

The identification information contained in the first message may include channel-ID and/or content-ID.

The identification information contained in the second message may include channel-ID and/or content-ID.

The method may further comprise: sending a fourth message to provide the result of content update for the content included in or referenced by the third message from the client terminal to the server; and receiving the fourth message by the server.

Either the first message or the third message may contain the information to request the fourth message.

In other aspect, there is provided a method for content update from a server to a client terminal in a dynamic content delivery (DCD) system, the method comprising: sending a request message to request content update from the client terminal to the server when a notification message to initiate the content update is received by the client terminal or on demand content update request, wherein the notification message contains an identification information of one or more contents available for update and the request message contains the identification information of an specific content to be updated among the one or more contents; receiving the request message by the server and sending a response message to respond to the request message, wherein the response message contains the content or the address thereof corresponding to the identification information contained in the second message; and receiving the response message by the client terminal.

The notification message may contain session-ID to identify a session between the server and the client terminal.

The identification information contained in the notification message may include channel-ID and/or content-ID.

The identification information contained in the request message may include channel-ID and/or content-ID.

The method may further comprise: sending a conformation message to provide the result of content update for the content included in or referenced by the third message from the client terminal to the server; and receiving the conformation message by the server.

Either the request message or the response message may contain the information to request the conformation message.

In another aspect, there is provided a dynamic content delivery (DCD) system for content update from a server to a client terminal, the system comprising: the sever to send a first message to the client terminal, wherein the first message contains an identification information of one or more contents available for update, and receive a second message to request content update to the server, wherein the second message contains the identification information of an specific content to be updated among the one or more contents, and send a third message to respond to the second message, wherein the third message contains the content or the address thereof corresponding to the identification information contained in the second message; and the client terminal to receive the first message from the server, and send the second message to the server, and receive the third message from the sever.

The first message may contain session-ID to identify a session between the server and the client terminal.

The identification information contained in the first message may include channel-ID and/or content-ID.

The identification information contained in the first message may include channel-ID and/or content-ID.

The system may further comprise: sending a fourth message from the client terminal to the server to provide the result of content update for the content included in or referenced by the third message; and receiving the fourth message by the server.

Either the first message or the third message may contain the information to request the fourth message.

In still another aspect, there is provided a method for content update to a client terminal by a server in a dynamic content delivery (DCD) system, the method comprising: sending a first message to the client terminal, wherein the first message contains an identification information of one or more contents available for update; receiving a second message to request content update, wherein the second message contains the identification information of an specific content to be updated among the one or more contents; and sending a third message to respond to the second message, wherein the third message contains the content or the address thereof corresponding to the identification information contained in the second message.

The first message may contain session-ID to identify a session between the server and the client terminal.

The identification information contained in the first message may include channel-ID and/or content-ID.

The identification information contained in the second message may include channel-ID and/or content-ID.

The method may further comprise: sending a fourth message from the client terminal to the server to provide the result of content update for the content included in or referenced by the third message; and receiving the fourth message by the server.

Either the first message or the third message may contain the information to request the fourth message.

In yet another aspect, there is provides a method for content update from a server by a client terminal in a dynamic content delivery (DCD) system, the method comprising: receiving a first message to the client terminal, wherein the first message contains an identification information of one or more contents available for update; sending a second message to request content update, wherein the second message contains the identification information of an specific content to be updated among the one or more contents; and receiving a third message to respond to the second message, wherein the third message contains the content or the address thereof corresponding to the identification information contained in the second message.

The first message may contain session-ID to identify a session between the server and the client terminal.

The identification information contained in the first message may include channel-ID and/or content-ID.

The identification information contained in the second message may include channel-ID and/or content-ID.

The method may further comprise: sending a fourth message from the client terminal to the server to provide the result of content update for the content included in or referenced by the third message; and receiving the fourth message by the server.

Either the first message or the third message may contain the information to request the fourth message.

In a further aspect, there is provided a method for content update from a server by a client terminal in a dynamic content delivery (DCD) system, the method comprising: sending a request message to request content update to the server when a notification message to initiate the content update is received or on demand content update request, wherein the notification message contains an identification information of one or more contents available for update and the request message contains the identification information of an specific content to be updated among the one or more contents; and receiving a response message to respond to the request message from the server, wherein the response message contains the content or the address thereof corresponding to the identification information contained in the second message.

The first message may contain session-ID to identify a session between the server and the client terminal.

The identification information contained in the first message may include channel-ID and/or content-ID.

The identification information contained in the second message may include channel-ID and/or content-ID.

The method may further comprise: sending a fourth message from the client terminal to the server to provide the result of content update for the content included in or referenced by the third message; and receiving the fourth message by the server.

Either the first message or the third message may contain the information to request the fourth message.

As mentioned above, the present invention is advantageous in that only the contents which the users want can be transmitted or received.

DESCRIPTION OF DRAWINGS

FIG. 4 shows the exemplary content list according to one embodiment.

MODE FOR INVENTION

Figure 1:
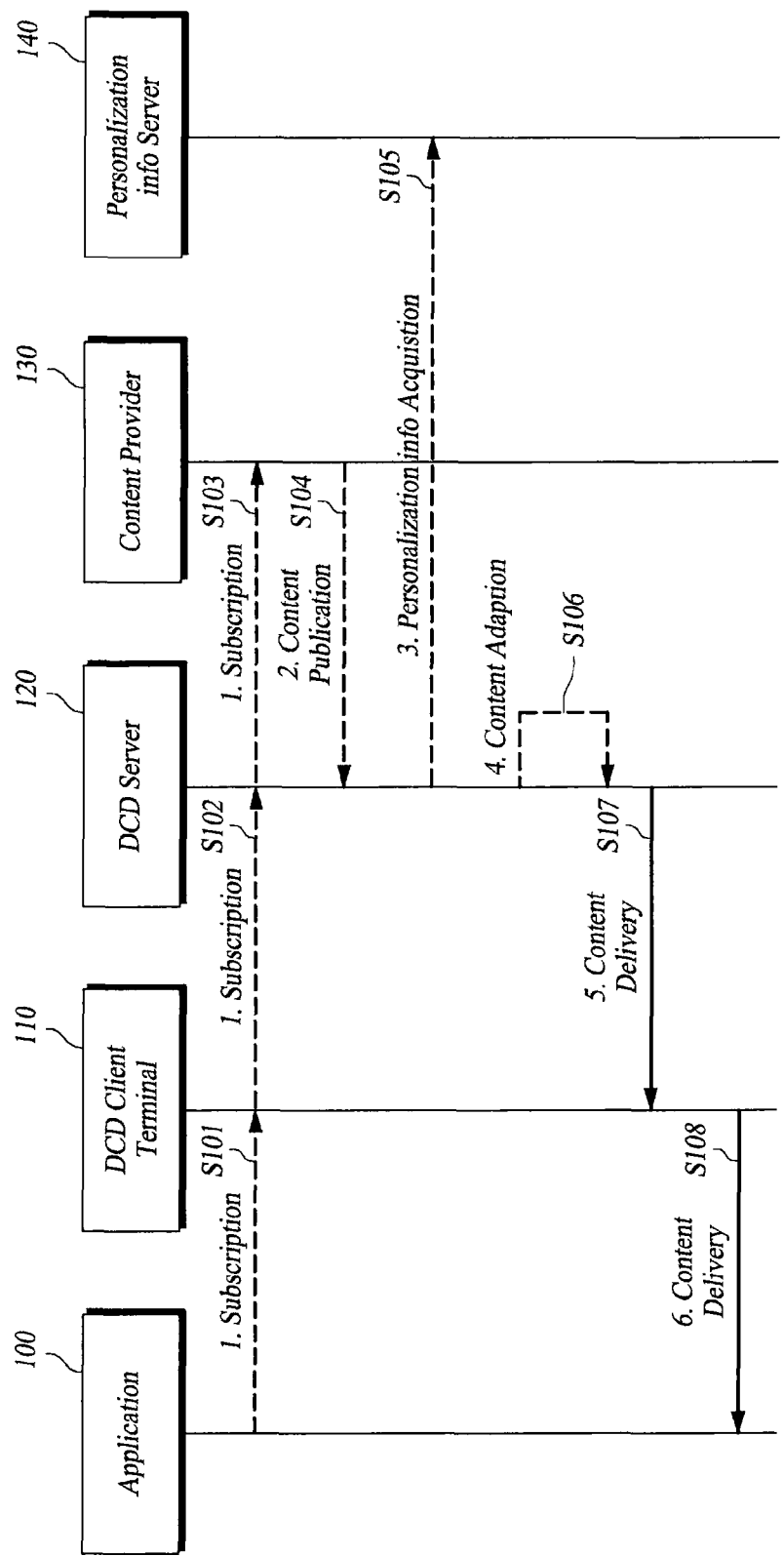
FIG. 1 shows the push scheme employing DCD-2 Interface.

Hereinafter, exemplary embodiments of the present invention will be described with reference to the accompanying drawings. In the following description and drawings, the same reference numerals are used to designate the same or similar components, and so repetition of the description on the same or similar components will be omitted. Furthermore, a detailed description of known functions and configurations incorporated herein is omitted to avoid making the subject matter of the present invention unclear.

Figure 2:
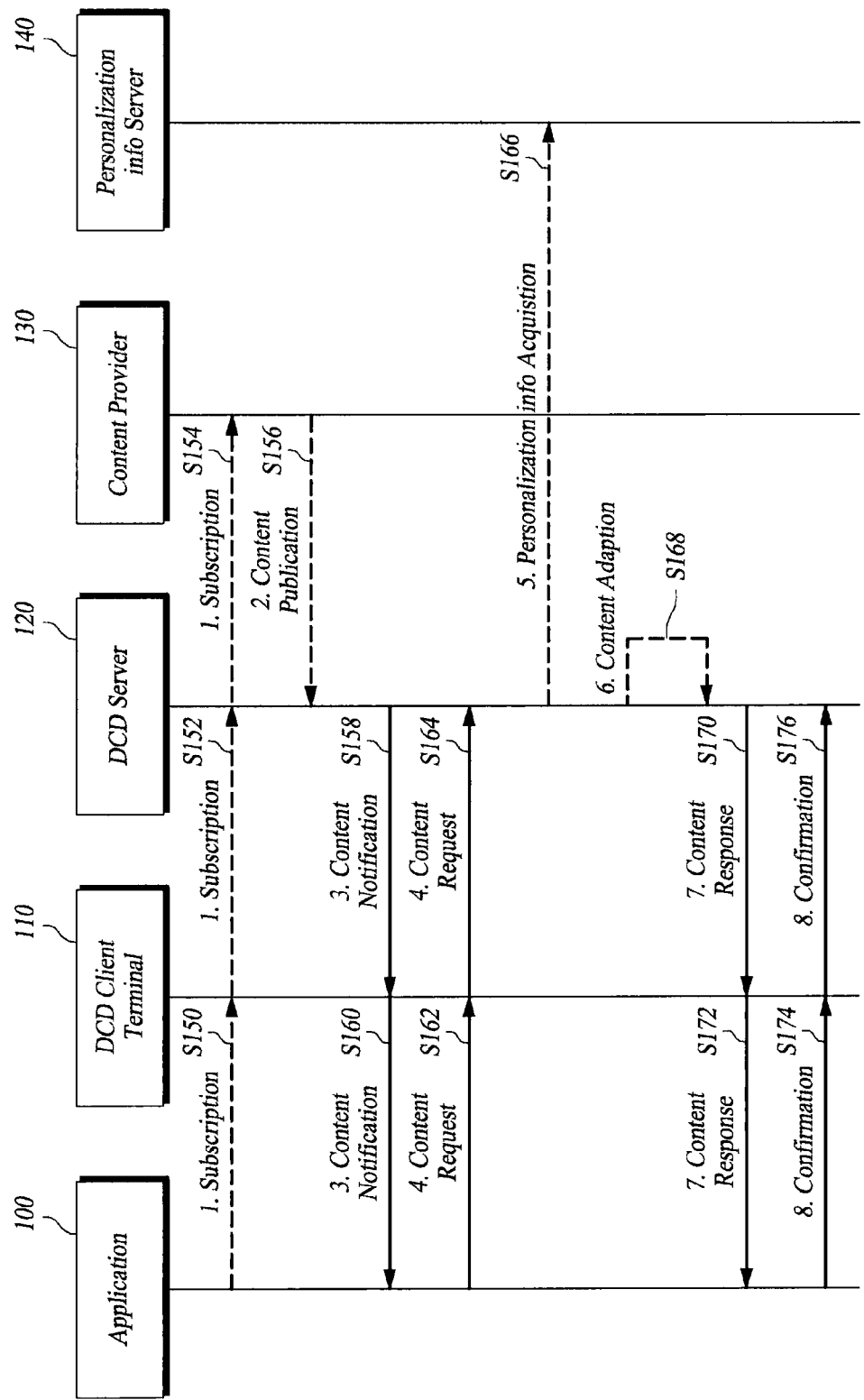
FIG. 2 is a flowchart showing the content delivery from the server to the mobile terminal according to the one embodiment.

FIG. 2 is a flowchart showing the content delivery from the server to the client terminal according to the one embodiment.

Referring to FIG. 2, the DCD system according to one embodiment in which the DCD client terminal 110 is provided with the dynamic content delivery (DCD) service from the DCD server 120, comprises the part of the mobile terminal which comprises the DCD enabled client application 100 and the DCD client terminal 110, and the part of the server which comprises the DCD server 120 and the DCD content provider 130 and personalization sources 140. In the specification below, the mobile terminal means one or both of the application 100 and the client terminal 110. Although the server means the DCD server 120 in a narrow sense, it may mean one or more of the DCD server 120, the DCD content provider 130 and the personalization sources 140 in a broad sense.

Subscription personalization request is sent from the application 100 to the DCD content provider 130 at S 150, S152 and S154 so that the application 100 receives and displays the content stored in the DCD content provider 130, that is, the DCD server 120 provides the mobile terminal with the DCD service or the mobile terminal is provided with the DCD service from the DCD server 120. The subscription personalization is optional according to the type of content. Because the specific content is not requested for the subscription.

The DCD content provider 130 publishes new or updated content at the DCD server 120 at S154. This could be either the content matching subscription preferences or some general content of interest to multiple DCD enabled client application 100.

The DCD Server 120 sends a first or a content availability notification message to initiate content update to the DCD client terminal 110 and then the DCD client terminal 110 receives it at S 158. The DCD client terminal 110 relays this notification message to the application 100 at S 160. This content notification message may contain an identification information of one or more contents available for update. For example, the identification information may contain one or more of a channel-ID to identify the channel to be updated and a content-ID to identify the content item. The notification message may contain session-ID to identify a session between the server 120 and the client terminal 110.

The content notification message may be sent over push or broadcast bearer. If the content notification message may be a broadcast message, it may contain a broadcast service-ID instead of the session-ID.

Although the above is described that the DCD server 120 sends the first or the notification message to the DCD client terminal 110 to initiate content update from the DCD server 120 to the DCD client terminal 110 in the DCD system according to one embodiment of the present invention, the present invention is limited thereto. Instead of initiating content update by sending the first or the notification message to the DCD client terminal 110, content update may be initiated by on demand content update requested, for example, triggering by the application 100, scheduled content update or content expiration.

The DCD client terminal 110 receives a second or a content update request message to request content update to the DCD server 120 from the application 100 at S 162 and then sends it to the DCD server 120 at S 164, when one or more of reception of the notification message and on demand content update requested occur. The DCD server 120 receives the content update request message at S 164.

The second message contains the identification information of a specific content to be updated among the one or more contents. For example, the identification information may contain one or more of a channel-ID to identify the channel to be updated, a content-ID to identify the content item, and a content address of the specific content items requested. The second message may contain session-ID to identify a session between the server 120 and the client terminal 110.

Therefore, the mobile terminal such as the DCD client terminal 110 can request only the content which the user wants, because the DCD client terminal 110 sends the content update request message to request content update for only the content which the user wants to the server.

The DCD Server 120 acquires personalization information required to perform content adaptation to personalization sources 140 at S 166. Such information may include location, presence, terminal profile, etc.

The DCD Server 120 performs content adaptation based on the acquired personalization information and the application profile preferences at S 168. S 166 and S 168 may not be necessary in view of both the parties of the DCD client terminal 110 and the DCD server 120.

The DCD server 120 sends a third message or a content response message to respond to the second or the content request message to the DCD client terminal 110, wherein the third message contains the content or the address thereof corresponding to the identification information contained in the second message at S 170. The client terminal 110 receives the content response message and relays it to the application 100 at S 172. The content sent to the application 110 is displayed on the mobile terminal such as the client terminal 120.

As a result, the DCD client terminal 110 is provided with the DCD service from the DCD server 120.

Finally, the DCD client terminal 110 receives a fourth message or a content update confirmation message to provide the result of content update for the content from the application 100 at S 174 and then sends it to the DCD server 120. The DCD server 120 receives the content update confirmation message at S 176.

The DCD client terminal 110 sends the content update request message with the identification information of the contents available for update to the DCD server 120 and then the DCD server 120 can send the specific contents or its address corresponding to the identification information of the contents available for update to the DCD client terminal 110. This prevents the DCD client terminal 110 from receiving the unnecessary content(s) and using the resource of the mobile terminal inefficiently. In other words, the DCD server 120 does not send the unnecessary content(s) to the DCD client terminal 110 so to reduce the load of the DCD server 120 as well as use the network resource efficiently.

Figure 3:
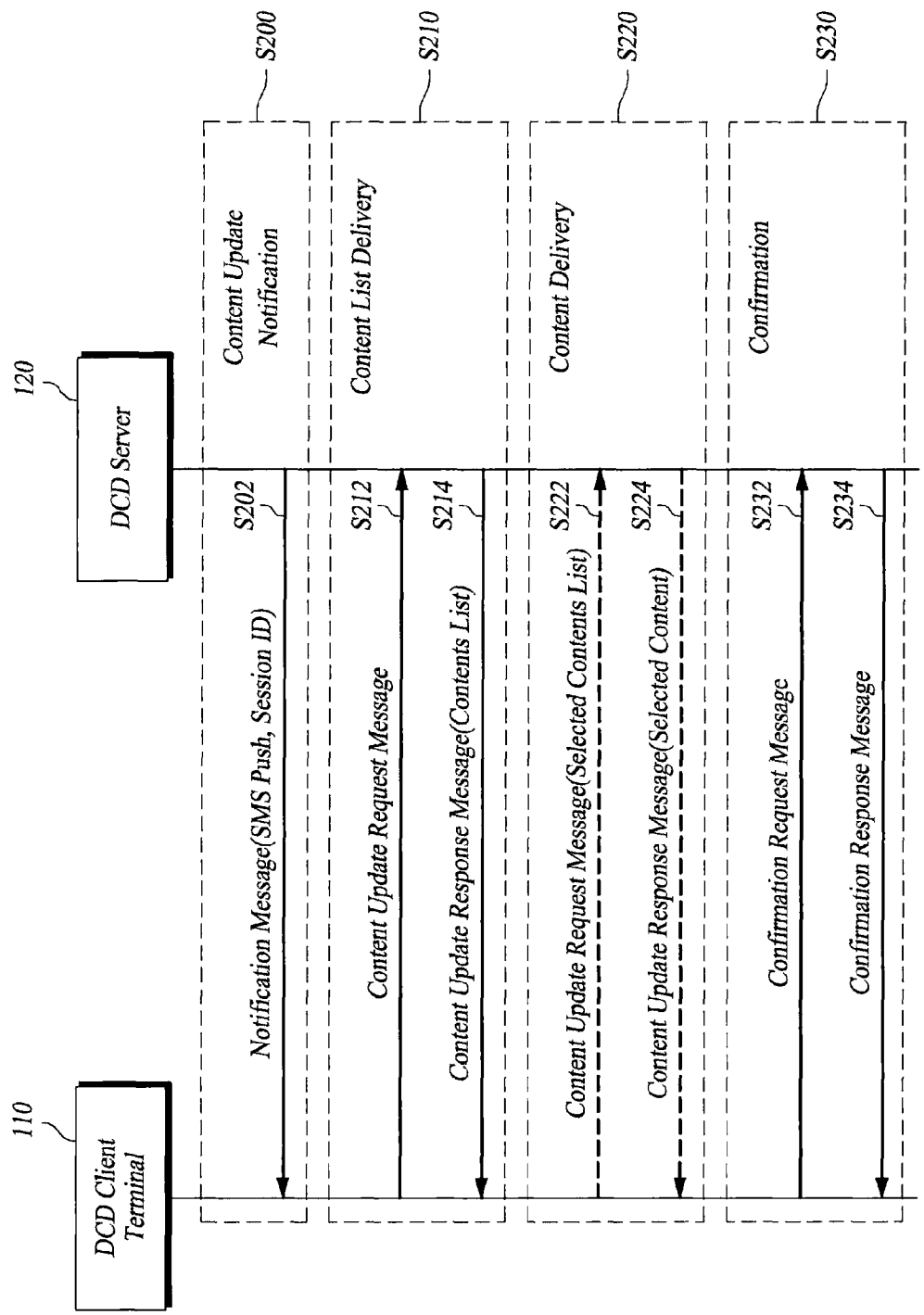
FIG. 3 is a flowchart showing the content delivery from the server to the client terminal according to other embodiment.

FIG. 3 is a flowchart showing the content delivery from the server to the mobile terminal according to other embodiment.

The DCD system according to other embodiment in which the DCD client terminal 110 is provided with the dynamic content delivery (DCD) service from the DCD server 120, comprises the part of the mobile terminal which comprises the DCD enabled client application 100 and the DCD client terminal 110, and the part of the server which comprises the DCD server 120 and the DCD content provider 130 and personalization sources 140 as shown in FIG. 2. FIG. 3 mainly shows the flowchart of content delivery between the DCD client terminal 110 and the DCD server 120 in the DCD system according to other embodiment.

Referring to FIG. 3, when the DCD client terminal 110 provided with the DCD service from the DCD server 120 in other embodiment, the DCD server 120 provides an identification information, in other words, content list information, of one or more of contents available for update with the client terminal 110 prior to the content delivery of the specific content.

Referring to FIG. 3, the method for the content delivery through sending the content list to the mobile terminal, comprises; a content update notification to notify the content update by sending the notification message from the DCD server 120 to the DCD client terminal 110 at S 200, a content list delivery to transfer the content list information from the DCD server 120 to the DCD client terminal 110 at S 210, a content delivery to deliver the content from the DCD server 120 to the DCD client terminal 110 at S 220, and a content delivery confirmation to confirm the content delivery at S 230.

The content update notification at S 200 is to send the notification message to notify the content update from the DCD server 120 to the DCD client terminal 110 at S 202.

The notification message may be the SMS push message to notify the content update for all contents available for update from the DCD server 120 to the DCD client terminal 110. The notification message may contain the session-ID between the DCD server 120 and the DCD client terminal 110.

The content list delivery at S 210 is to transfer the content list information about all contents available for update from the DCD server 120 to the DCD client terminal 110. The content list delivery at S 210 comprises; receiving the content update request message from the DCD client terminal 110 to the DCD server 120 at S 212 and sending the content update response message to the DCD client terminal 110 by the DCD server 120.

S 202, S 212 and S 214 may consist of the following three steps: sending the notification message to notify the content update by the DCD server 120, requesting the content list to the DCD server 120 by the DCD client terminal 110 and sending the identification information, in other words, contest list information, of one or more of contents available for update to the DCD server 110 by the DCD client terminal 120. But the above three steps at S 202, S 212 and S 214 are performed by one step to send the identification information of one or more of contents available for update to the DCD client terminal 120 by the DCD server 120 such as the content notification at S 158 of FIG. 2.

The content list information may be stored in the DCD content provider 130 on FIG. 2. The content list information may comprise the identification information of all contents such as one or more of contents available for update to the DCD client terminal 110 which may contain one or more of the content-ID for all contents, the content size information, the application-ID and the channel-ID.

The above-described content size information such as the total size of all contents and the size of each content from the DCD server 120 allows the DCD client terminal 110 to perform the function of memory management.

As the DCD client terminal 110 selects two or more of contents among all contents on the content list and sets the selected contents to the delivery priorities different from each other, so the DCD server 120 may provide the DCD service with the DCD client terminal 110 in priority order.

The content delivery at S 220 is to deliver the selected contents among all contents to the DCD client terminal 110 by the DCD server 120. The content delivery at S 220 may comprise receiving the content update request message for the selected content on the content list at S 222 and sending the content update response message containing the selected content to the DCD client terminal 110 by the DCD server 120 at S 224.

The selected content is the content selected among all contents by the DCD client terminal.

Following the above content list delivery, if the DCD client terminal 110 selects one or more of other contents among all contents except for the above selected content(s), S 222 and S 224 are repeated for each content.

When each of the above selected contents has the delivery priority which are set by the DCD client terminal 110, S 220 and S 224 are performed for the content of them with the higher priority at first and the DCD client terminal 110 is provided with the DCD service in priority order.

The content delivery confirmation at S 230 is to confirm the content delivery. The content delivery confirmation at S 230 may comprise; receiving the request message for content deliver confirmation from the DCD client terminal 110 at S 232 and sending the response message for content deliver confirmation at S 234. But the content delivery confirmation at S 230 may not be necessary and may be omitted in this DCD system or is simplified to one step to send the confirmation message to the DCD server 120 by the DCD client terminal 110.

Other embodiment is advantageous in that the DCD server 120 does not send the content which the user does not want so that it can reduce the load of the DCD server 120 as well as use the network resource efficiently.

The terminal users know the kind and the size of content, and the kind of channel prior to the content delivery in advance so that they can select only the content which they want. Also, the size of content available to update is confirmed so that the content delivery is stopped before finishing due to the insufficient storage space.

The above method for the content delivery enables the contents available for update to set the different priority so as to deliver the contents by the DCD server 120 in priority order.

FIG. 4 shows the exemplary content list according to one embodiment.

FIG. 4 shows the exemplary content list which the DCD client terminal 110 sends to the DCD server 120 to include all contents information at S 214 among S 210, and the DCD server 120 sends to the client terminal 110 to include the selected contents information at S 224 among S 220. This content list may be the identification information of one or more of contents available for update.

The content list 300 may include one or more of a content-ID 310, a content size 320, a application-ID 330, a channel-ID 340 and the total size of all contents 350.

Referring to FIG. 4, all contents include the first content 311 with content-ID "CO1", the second content 312 with content-ID "CO2", the third content 313 with content-ID "CO3" and the fourth content with content-ID "CO4". The total size of all contents is "520 KB (Kilo Byte)".

In detail, the first content 311 with content-ID "CO1" has the content size of "100 KB" (Kilo Byte), the application-ID of "A01" which is the identifier of the DCD enabled client application to enable the DCD client terminal 110 to drive or display the specific content, and the channel-ID of "CH01" which is the channel information.

The second content 312 with content-ID "CO2" has the content size of "120 KB" (Kilo Byte), the application-ID of "A01" and the channel-ID of "CH01".

The third content 313 with content-ID "CO3" has the content size of "90 KB" (Kilo Byte), the application-ID of "A02" and the channel-ID of "CH01".

The fourth content with content-ID "C04" has the content size of "210 KB" (Kilo Byte), the application-ID of "A03" and the channel-ID of "CH02".

The above content list 300 including all contents information at S 214 among S 210 may be sent to the DCD client terminal 110 by the DCD server 120 in the various form. For example, the content list 300 may consist of one or more of comma separated list of content-IDs within the specific field such as the content-ID field, comma separated list of content size for the specific content within the content size field, comma separated list of IDs for channels to be updated within the channel-ID field, comma separated list of application IDs within the application ID field. For other example, if the content list 300 includes only content-ID and channel-ID, the DCD server 120 sends it to the DCD client terminal 110 with the separated comma lists of them within the specific fields of them.

If the DCD server 120 sends all contents with the total size of 500 KB to the DCD client terminal 110 without the content list information in advance, the DCD client terminal 110 with the spared storage space of 400 KB does receive all of them because of the content delivery of contents 313 and 314 in the content list 300 which the user does not need to update.

After the DCD client terminal 110 receives from the DCD server 120 the content list 300 with the information of all content in advance at S 214, the DCD client terminal 110 can send the content update request message containing the identification information such as the content-ID, the content size, the application-ID and the channel-ID of the selected contents 311 and 312 with content-IDs of "C01" and "C02" to the DCD server 120 at S 222. The DCD client terminal 110 receives only the selected contents 311 and 312 contained in the content update response message without overflow of the spared storage space at S 224. Also, the above-described content size information such as the total size of all contents and the size of each content from the DCD server 120 allows the DCD client terminal 110 to perform the function of memory management.

Referring to FIG. 4, if the selected contents are the contents 311 and 312 with the content-IDs of "C01" and "C02", they may be set to the different priorities so that the DCD client terminal 110 receives the selected contents from the DCD server 120 in priority order.

Figure 5:
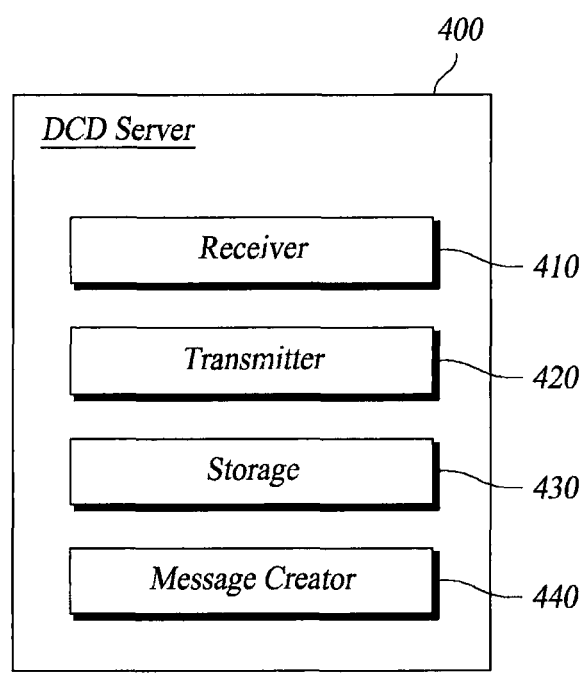
FIG. 5 shows the internal construction of the server which provides the client terminal with the content delivery posterior to delivering the content list.

FIG. 5 shows the internal construction of the DCD server which provides the DCD client terminal with the content delivery posterior to delivering the content list.

Referring to FIG. 5, the DCD server 400 includes a receiver 410, a transmitter 420, a storage 430 and a message creator 440.

The receiver 410 is adapted to receive the content update request messages and the content update confirmation request messages in FIG. 2 and FIG. 3. The receiver 410 is also adapted to receive the selected contents which information is contained in the content update request from the DCD content provider 130 in FIG. 2.

The transmitter 420 is adapted to transmit the content notification messages, the content response messages with only the selected contents, and the content update confirmation response messages in FIG. 2 and FIG. 3

The storage 430 is adapted to store the selected contents received by the receiver 410 from the DCD content provider 130 in FIG. 2.

The message creator 440 is adapted to create the content notification, request, response, confirmation messages, which are necessary for the content delivery.

Although the embodiments are described above, but the present invention is not limited thereto. For example, it is possible to variously combine one embodiment as shown in FIG. 2 with other embodiments as shown in FIG. 3 and FIG. 4.

Although several exemplary embodiments of the present invention have been described for illustrative purposes, those skilled in the art will appreciate that various modifications, additions and substitutions are possible, without departing from the scope and spirit of the invention as disclosed in the accompanying claims.

INDUSTRIAL APPLICABILITY

As mentioned above, the present invention is advantageous in that only the contents which the users want can be transmitted or received.

The invention claimed is:

1. A method for content update from a server to a client terminal in a dynamic content delivery (DCD) system, the method comprising:
    sending a first message including a content list to the client terminal, the content list including identification information and size information on one or more contents subject to update to thereby help a user to manage a memory in the client terminal;
    the server receiving a second message from the client terminal requesting updated content with the second message including the identification information on at least one contents selected by the client terminal from the content list and further including a delivery priority set by the client terminal associated with the at least one contents subject to update included in the first message wherein the priority in delivery is set differently for each content by the client terminal for delivering said at least one contents to the client terminal; and
    sending a third message from the server to the client terminal in response to the second message including said at least one contents or the address thereof requested by the second message subject to delivery pursuant to the delivery priority set by the client terminal included in the second message.

2. The method as claimed in claim 1, wherein the size information includes both the size of each content in the content list and the total size of all the contents in the content list.

3. The method as claimed in claim 1, wherein the delivery priority for delivering said at least one contents to the client terminal is set by the client terminal.

4. The method as claimed in claim 1, wherein the identification information includes at least one of channel-ID and content-ID.

5. The method in claim 1, further comprising:
    receiving a fourth message notifying the result of content receipt from the client terminal.

6. A method for content update from a server by a client terminal in a dynamic content delivery (DOD) system, the method comprising:
    sending a first message from the server to the terminal which includes a content list comprising identification information and size information on one or more contents subject to update to thereby help a user to manage a memory in the client terminal;

sending a second message to the server from the terminal in response to the first message requesting updated content with the second message including the identification information on said at least one contents selected by the client terminal from the content list and a delivery priority set by the client terminal associated with said at least one contents; and with the terminal receiving a third message from the server in response to the second message pursuant to the delivery priority of the client terminal included in the second message with the delivery priority being set differently for each content by the client terminal such that the third message includes said at least one contents or the address thereof requested by the second message pursuant to said delivery priority as set differently for each content by the client terminal when delivering said at least one contents to the client terminal included in the second message.

7. The method as claimed in claim 6, wherein the size information includes both the size of each content in the content list and the total size of all the contents in the content list.

8. The method as claimed in claim 6, wherein the delivery priority for delivering said at least one contents to the client terminal is set by the client terminal.

9. The method as claimed in claim 6, wherein the identification information includes at least one of channel-ID and content-ID.

10. The method in claim 6, further comprising: sending a fourth message notifying the result of content receipt to the server.

* * * * *